Jan. 21, 1964  V. H. SELIGER  3,119,070
SIGNAL DERIVATIVE DETECTION DEVICE
Filed Oct. 10, 1961  2 Sheets-Sheet 1
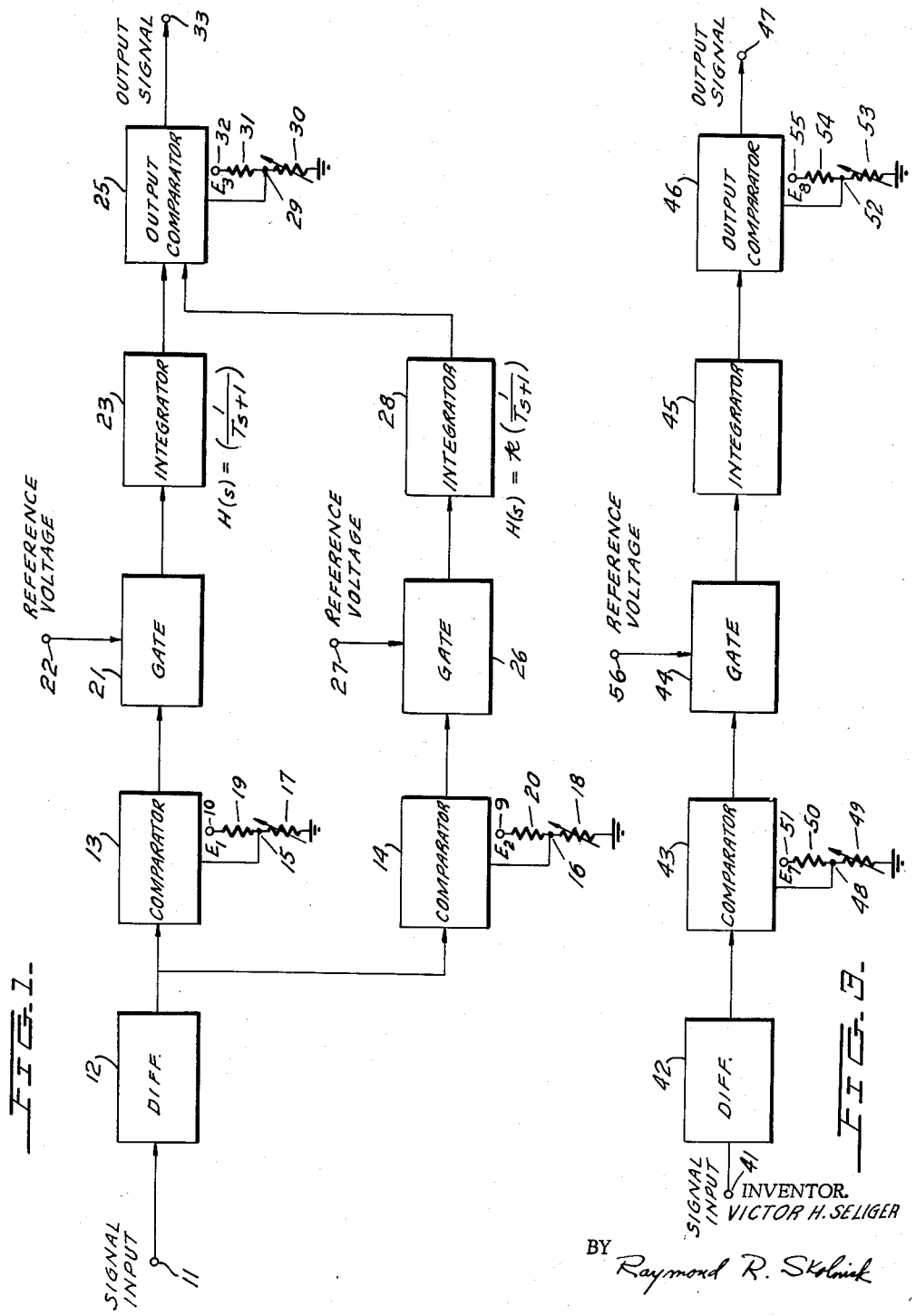
INVENTOR.
VICTOR H. SELIGER
BY Raymond R. Skolnick
AGENT

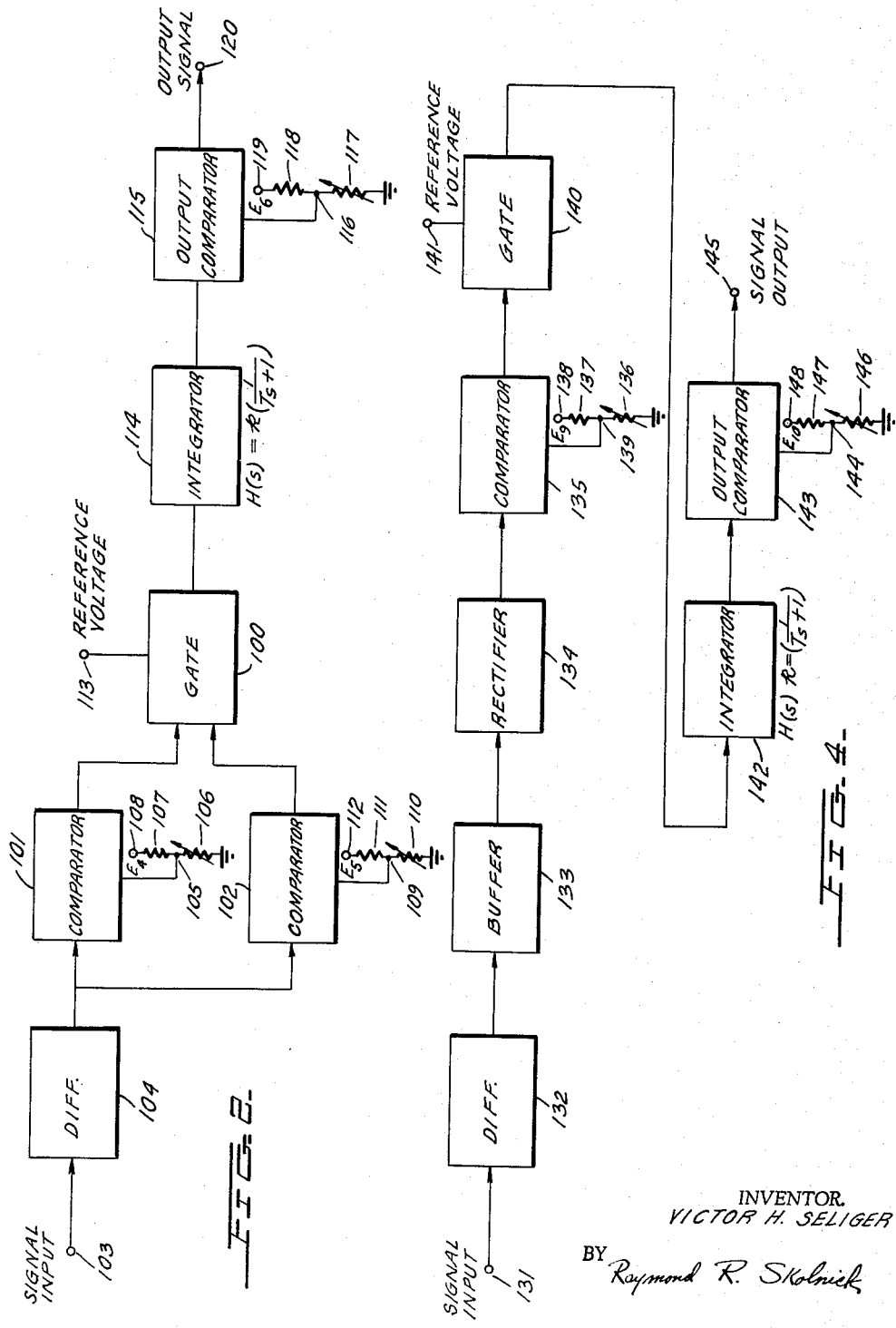

United States Patent Office 3,119,070
Patented Jan. 21, 1964

3,119,070
SIGNAL DERIVATIVE DETECTION DEVICE
Victor H. Seliger, Lynbrook, N.Y., assignor to Sperry Rand Corporation, Ford Instrument Company Division, Long Island City, N.Y., a corporation of Delaware
Filed Oct. 10, 1961, Ser. No. 144,077
14 Claims. (Cl. 328—114)

The instant invention relates to devices for producing an output signal which is indicative of the fact that there has been a substantial change in value of the input signal and more particularly to a device of this type which is responsive to the rate of change of the input signal in conjunction with the length of time over which this change prevails.

In general, the prior art has provided two classes of devices for providing an output signal which is indicative of the fact that a substantial change in the value of the input signal has occurred. The first class utilizes quasi-permanent storage of the value at time $t_0$ of the signal, and compares subsequent value of the sigal with the stored value to determine whether a significant change has occurred. The second class utilizes a differentiation process to determine the slope of the input signal and then uses either the value of this slope or some other property thereof to determine whether a significant change has occurred.

It has been found that the devices of class 1 are generally superior to the devices of class 2 with respect to accuracy of operation or other such performance criteria. However, the devices of class 2 are generally more economical to produce and maintain and may be made more compactly than are the devices of class 1.

In prior art devices utilizing a differentiator, while the presence of a high slope or high time rate of change of signal was detected, there was a failure to take into account the length of time over which this rate of change of signal prevailed. Because of this, the prior art devices were inherently sensitive to spurious signals usually in the form of noise.

The instant invention overcomes this undesirable characteristic of prior art devices by providing an arrangement in which the input signal is presented to a differentiator whose output feeds a first comparator. The input of this comparator is compared to a first threshold voltage and if the former exceeds the latter there is an output from the first comparator which opens a normally closed gate. Opening of the gate is effective to apply a reference voltage to an integration circuit which provides an output that increases as a function of the time for which the gated reference voltage has continuously been applied. The integrator is effective to produce an output applied to a second comparator to produce an output only when the signal fed to the second comparator exceeds a predetermined threshold voltage.

Accordingly, a primary object of this invention is to provide a signal derivative detection device which is insensitive to noise and other spurious signals.

Another object is to provide a signal derivative detection device of this type which is economical to produce and is reliable in operation.

Still another object is to provide a signal derivative detection device which is responsive to the rate of change of the input signal in conjunction with the length of time over which this rate of change prevails.

These as well as other objects of this invention will become readily apparent after reading the following description of the accompanying drawings in which:

FIGURE 1 is a block diagram illustrating a first embodiment of my invention which utilizes separate comparators and integrators for operating on positive and negative signal slopes.

FIGURE 2 is a block diagram illustrating another embodiment of my invention in which individual comparators are utilized for operating on positive and negative signal slopes with the outputs of both comparators being fed to a single normally closed gate which will open in response to signals received from either of the comparators.

FIGURE 3 is another embodiment of my invention in block diagram form in which a single comparator is utilized for operating on positive or, alternately, negative input signal slopes.

FIGURE 4 is a block diagram illustrating another embodiment of my invention in which a buffer, a rectifier, and a comparator are cascaded to operate on both positive and negative signal slopes.

Now referring to the figures and more particularly to FIGURE 1, the signal input at terminal 11 is fed to differentiator 12 whose output is applied to the inputs of comparators 13 and 14. Comparators 13 and 14 are each provided with a reference or threshold at 15 and 16, respectively, each adjustable by means of rheostats 17 and 18, respectively.

Rheostat 17 is connected in series with resistor 19 between ground and a reference voltage $E_1$ appearing at terminal 10 while rheostat 18 is connected in series with resistor 20 between ground and a reference voltage $E_2$ appearing at terminal 9. The output of comparator 13 is connected to normally closed gate 21 which when open connects a reference voltage appearing at terminal 22 to integrator 23 whose output is fed to output comparator 25. Similarly, the output of comparator 14 is fed to normally closed gate 26 which when open connects a reference voltage appearing at terminal 27 to the input of integrator 28 whose output is also fed to output comparator 25. Output comparator 25 is provided with a reference voltage level or threshold at point 29 which is adjustable by means of rheostat 30 connected in series with resistor 31 between ground and a reference voltage $E_3$ appearing at terminal 32.

The circuit of FIGURE 1 operates as follows: differentiator 12 produces an output which is approximately proportional to the time rate of change of the input signal appearing at terminal 11. Ignoring for the moment the chain of functional elements 14, 26 and 28, the signal from differentiator 12 is applied to comparator 13 which provides an output when and only when the input from differentiator 12 exceeds in positive value the threshold voltage at 15. When there is an output from comparator 13 the gate 21 is opened and the reference voltage at terminal 22 is applied to integrator 23.

Integrator 23 provides an output which increases as a function of the time for which the gated reference voltage at terminal 22 has continuously been applied to integrator 23. Typically, the transfer function for integrator 23 may be as follows:

$$H(s) = k\left(\frac{1}{Ts+1}\right)$$

where T is a time constant. Where additional smoothing is deemed desirable the transfer function may be of the form:

$$H(s) = k \prod_{i=1}^{n}\left(\frac{1}{T_i s+1}\right)$$

when $T_i$ is $i^{th}$ time constant and $n$ is an integer greater *than* 1. Pi in the above equation is the symbol, well known in mathematics, to denote the product of all quantities of a given collection. The output of integrator 23 is applied to the output comparator 25, which produces an output at terminal 33 when and only when one or the other of its two inputs exceeds the threshold voltage at point 29.

Similarly, the output of differentiator 12 is also fed to comparator 14 which produces an output when and only when its input is more negative than the reference level established at point 16. The output of comparator 14 is effective to open gate 26 which when open connects the reference voltage appearing at terminal 27 to the input of integrator 28 whose output is fed to output comparator 25.

The net result of the cooperative action of the elements hereinbefore described is that whenever the voltage representative of the time rate of change of the input signal appearing at terminal 11 is more positive than the reference level at point 15 or more negative than the reference level at point 16, one of two integration processes is initiated or renewed; whenever either integration process produces a voltage which exceeds the reference level at point 29 comparator 25 produces an output. Thus, it is seen that the presence of an output from output comparator 25 is indicative of the recent existence, over a measurable time period, of a high rate of change of input signal.

FIGURE 2 illustrates another embodiment of this invention in which there is a normally closed gate 100 with an additive circuit. Gate 100 is open when either comparator 101 or comparator 102 produces an output above a predetermined level. The embodiment of FIGURE 2 also includes terminal 103 at which the input signal is introduced to the system. The input signal is fed to differentiator 104 whose output drives both comparators 101 and 102. Comparator 101 includes means for establishing a positive threshold or reference level at point 105 with its reference level being adjustable by means of rheostat 106 connected in series circuit with resistor 107 between ground and a positive voltage source $E_4$ at terminal 108.

In a similar manner comparator 102 is provided with means for establishing a negative threshold or reference level at point 109 with this reference level being adjustable by means for rheostat 110 connected in series circuit with resistor 111 from ground to a negative voltage source $E_5$ appearing at terminal 112.

Gate 100 when open connects a reference voltage appearing at terminal 113 to the input of integrator 114 whose output is fed to output comparator 115. Comparator 115 is provided with means for establishing a threshold or reference level adjustable by means of rheostat 117 connected in series circuit with resistor 118 from ground to a reference voltage $E_6$ appearing at terminal 119. Comparator 115 will produce an output appearing at terminal 120 when and only when the output of integrator 114 exceeds a predetermined value as determined by the reference level setting at point 116.

As in the embodiment of FIGURE 1 comparator 101 will produce an output when differentiator 104 generates an output which is more positive than a predetermined level established by the threshold setting at point 105. Similarly, comparator 102 will produce an output when differentiator 104 generates an output which is more negative than a predetermined level in accordance with the threshold setting of point 109. As previously noted, an output from comparators 101 or 102 alone or in combination will be effective to open gate 100 which when open feeds an input to integrator 114 whose output drives comparator 115.

The embodiment of FIGURE 3 comprises a single cascaded chain including in order input terminal 41, differentiator 42, comparator 43, normally closed gate 44, integrator 45, output comparator 46 and output terminal 47. Comparator 43 is provided with means for establishing a threshold or reference level at point 48. The reference level is adjustable by means of rheostat 49 connected in series circuit with resistor 50 between ground and terminal 51 to which a reference voltage $E_7$ is applied. Similarly, output comparator 46 is provided with means for establishing a threshold or reference level at point 52 with this reference level being adjustable by means of rheostat 53. Rheostat 53 is connected in series circuit with resistor 54 between ground and terminal 55 at which another reference voltage, $E_8$, is present.

Comparator 43 is either constructed so that it will produce an output when the output from differentiator 42 is greater than the threshold at 48 or less than the threshold at 48, but not for both conditions. As in the embodiment of FIGURE 1 an output from comparator 43 is effective to open gate 44 which when open applies the reference voltage appearing at terminal 56 to the input of integrator 45. When the output from integrator 45 exceeds a predetermined level as determined by the threshold setting at point 52, output comparator 46 will produce an output at terminal 47 indicative of the recent existence over a measurable time period of a significant rate of change of the signal impressed upon input terminal 41.

FIGURE 4 illustrates another embodiment of this invention in which the input signal fed to terminal 131 drives differentiator 132 whose output is fed through an isolating buffer 133 and cascade connected rectifier 134 to comparator 135. As in the other embodiment, comparator 135 is provided with series connected rheostat 136 and resistor 137 extending between ground and terminal 138. A suitable voltage source $E_9$ is connected at terminal 138 to establish a threshold or reference level at point 139. When the input to comparator 135 is of such a magnitude that it exceeds a predetermined level in accordance with the threshold setting at point 139, comparator 135 produces an output which is effective to open normally closed gate 140. The opening of gate 140 connects the reference voltage appearing at terminal 141 to the input of integrator 142 whose output drives output comparator 143.

When the output of integrator 142 is above a level established in accordance with the threshold or reference level setting at 144 comparator 143 will produce a signal appearing at output terminal 145. The threshold setting at point 144 is established by rheostat 146 and resistor 147 connected in series from ground to terminal 148 having a suitable voltage $E_{10}$ impressed thereon. In this embodiment, the existence of an output at terminal 145 is indicative of the recent existence over a measurable time period of a significant positive or negative rate of change of the signal impressed upon terminal 131.

My invention has been described in connection with block diagrams only since circuit implementation employing vacuum tubes, transistors, and diodes are well-known to the electronics art. By way of example the comparators, gates, integrators, and differentiators may be of basic types described in the text entitled "Pulse and Digital Circuits" by Millman and Taub, published by the McGraw-Hill Book Co., Inc., of New York, N.Y., in 1956. The isolating buffer 133 or stage of impedance isolation is of the type described in the Radio Engineering Handbook, Fourth edition, published by the McGraw-Hill Book Co., Inc., of New York, in 1950.

It should be obvious to those skilled in the art that in the embodiments of FIGURES 1, 3 and 4 the function of the gate or gates may be combined with that of the comparators which drive the respective gates. That is, each output from these comparators may be used, with or without buffering, as the input to an integrator. Further, gate 100 of the embodiment illustrated in FIGURE 2 may be replaced by an addition circuit so that a linear combination of the outputs from both comparators 101 and 102 is the input to integrator 114.

Although I have here described preferred embodiments of my invention, it is understood that the present disclosure has been made by way of example and that numerous changes in the details of construction and the combination and arrangement of parts may be resorted to without departing from the spirit and the scope of the invention as hereinafter claimed.

I claim:
1. A device of the class described comprising a differentiator, a first comparator driven by said differentiator in accordance with the character of signals fed to said differentiator, an integrator driven by said first comparator whenever signals produced by said differentiator fall beyond a predetermined limit and a second comparator driven by said integrator in accordance with a predetermined transfer function of said integrator, said second comparator constructed to produce an output whenever the action of said transfer function results in a signal being fed to said second comparator which exceeds a predetermined reference level for said second comparator.

2. The device of claim 1 in which the transfer function is as follows:

$$H(s) = k\left(\frac{1}{Ts+1}\right)$$

3. The device of claim 1 in which the transfer function is as follows:

$$H(s) = k \prod_{i=1}^{n}\left(\frac{1}{T_i s+1}\right)$$

where $T_i$ is the $i^{th}$ time constant and $n$ is any integer greater than 1.

4. A device of the class described comprising a differentiator, a first comparator driven by said differentiator in accordance with the character of signals fed to said differentiator, an integrator, a reference voltage means, a normally closed gate which when open connects said reference voltage means to said integrator, said gate connected to said first comparator and being open whenever signals produced by said differentiator fall beyond a predetermined limit, and a second comparator driven by said integrator in accordance with a predetermined transfer function of said integrator, said second comparator constructed to produce an output whenever the action of said transfer function results in a signal being fed to said second comparator which exceeds a predetermined reference level for said second comparator.

5. The device of claim 4 in which there is a buffer means following the differentiator and a rectifier before the first comparator.

6. A device of the class described comprising a differentiator, a first and a second comparator each driven by said differentiator, a first integrator driven by said first comparator whenever signals produced by said differentiator are above a first predetermined limit, a second integrator driven by said second comparator whenever said signals produced by said differentiator are below a second predetermined limit which is below said first predetermined limit, and an output comparator driven by both of said integrators in accordance with their respective predetermined transfer functions, said output comparator constructed to produce an output when either input thereto exceeds a predetermined reference level for said output comparator.

7. The device of claim 6 in which there is a first normally closed gate which when open connects a reference voltage to said first integrator, said first comparator having its output connected to said first gate for opening said first gate in response to an output from said first comparator and a second normally closed gate which when open connects a reference voltage to said integrator, said second comparator having its output connected to said second gate for opening said second gate in response to an output from said second comparator.

8. The device of claim 6 in which the transfer functions are as follows:

$$H(s) = k\left(\frac{1}{Ts+1}\right)$$

9. The device of claim 6 in which the transfer functions are as follows:

$$H(s) = k \prod_{i=1}^{n}\left(\frac{1}{T_i s+1}\right)$$

where $T_i$ is the $i^{th}$ time constant and $n$ is any positive integer greater than 1.

10. A device of the class described comprising a differentiator, a first and a second comparator each driven by said differentiator, said first comparator having a first threshold and constructed to produce a first output whenever said differentiator produces a signal which is above said first threshold, said second comparator having a second threshold and constructed to produce a second output whenever said differentiator produces a signal which is below said second threshold, a normally closed gate means open in response to said first and said second outputs, an integrator, said gate upon opening thereof connecting a signal input to said integrator, an output comparator driven by said integrator in accordance with a predetermined transfer function of said integrator, said output comparator constructed to produce an output whenever the action of said transfer function results in a signal being fed to said second comparator which exceeds a predetermined reference level for said second comparator.

11. The device of claim 10 in which the gate will be open in response to the occurrence of either said first or said second output.

12. The device of claim 10 in which the signal input to said integrator is a linear additive combination of said first and said second outputs.

13. The device of claim 10 in which the transfer functions are as follows:

$$H(s) = k\left(\frac{1}{Ts+1}\right)$$

14. The device of claim 10 in which the transfer functions are as follows:

$$H(s) = k \prod_{i=1}^{n}\left(\frac{1}{T_i s+1}\right)$$

where $T_i$ is the $i^{th}$ time constant and $n$ is any positive integer greater than 1.

References Cited in the file of this patent
UNITED STATES PATENTS
3,005,165   Lenigan _____ Oct. 17, 1961